United States Patent
Wu et al.

(10) Patent No.: US 8,719,362 B2
(45) Date of Patent: May 6, 2014

(54) TIERED STORAGE INTERFACE

(75) Inventors: David Tze-Si Wu, Fremont, CA (US);
Vivasvat Keswani, Fremont, CA (US);
Nitin Parab, Menlo Park, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 399 days.

(21) Appl. No.: 12/878,992

(22) Filed: Sep. 9, 2010

(65) Prior Publication Data
US 2012/0066337 A1    Mar. 15, 2012

(51) Int. Cl.
*G06F 15/167* (2006.01)

(52) U.S. Cl.
USPC ........... 709/214; 709/203; 709/213; 709/217; 709/219; 709/223

(58) Field of Classification Search
USPC .................. 709/203, 213, 214, 217, 219, 223
See application file for complete search history.

(56) References Cited

U.S. PATENT DOCUMENTS

| | | | | |
|---|---|---|---|---|
| 2002/0013832 A1* | 1/2002 | Hubbard | .................. | 709/220 |
| 2006/0218366 A1* | 9/2006 | Fukuda et al. | ................. | 711/165 |
| 2008/0080718 A1* | 4/2008 | Meijer et al. | .................. | 380/282 |
| 2010/0274772 A1* | 10/2010 | Samuels | ........................ | 707/693 |
| 2010/0333116 A1* | 12/2010 | Prahlad et al. | ................. | 719/328 |
| 2011/0106862 A1* | 5/2011 | Mamidi et al. | ................. | 707/823 |
| 2011/0106863 A1* | 5/2011 | Mamidi et al. | ................. | 707/823 |
| 2011/0276539 A1* | 11/2011 | Thiam | ........................... | 707/634 |
| 2011/0314069 A1* | 12/2011 | Alatorre et al. | ............... | 707/827 |
| 2012/0042130 A1* | 2/2012 | Peapell | ......................... | 711/126 |
| 2012/0054253 A1* | 3/2012 | Guarraci | ....................... | 707/825 |
| 2012/0066337 A1* | 3/2012 | Wu et al. | ........................ | 709/214 |
| 2012/0110044 A1* | 5/2012 | Nagpal et al. | ................. | 707/827 |

\* cited by examiner

*Primary Examiner* — Liangche A Wang
(74) *Attorney, Agent, or Firm* — Park, Vaughan, Fleming & Dowler LLP

(57) ABSTRACT

The cloud storage services are extended with a cloud storage service access protocol that enables users to specify a desired storage tier for each data stream. In response to receiving storage tier specifiers via the protocol, the cloud storage service performs storage operations to identify target storage devices having attributes matching those associated with the requested storage tier. The cloud storage service stores a data stream from the storage client in the identified target storage device associated with the desired storage tier. Storage tiers can be defined based on criteria including capacity costs; access latency; availability; activation state; bandwidth and/or transfer rates; and data replication. The cloud storage service protocol allows data streams to be transferred between storage tiers, storage devices to be activated or deactivated, and data streams to be prefetched and cached. The cloud storage services may charge storage clients based on storage tier use and associated operations.

18 Claims, 2 Drawing Sheets

TIERED STORAGE INTERFACE

BACKGROUND OF THE INVENTION

The present invention relates generally to data storage systems, and systems and methods to improve storage efficiency, compactness, performance, reliability, and compatibility. In general, data storage systems receive and store all or portions of arbitrary sets or streams of data. Data storage systems also retrieve all or portions of arbitrary sets or streams of data. A data storage system provides data storage and retrieval to one or more storage clients, such as user and server computers. Stored data may be referenced by unique identifiers and/or addresses or indices. In some implementations, the data storage system uses a file system to organize data streams into files. Files may be identified and accessed by a file system path, which may include a file name and one or more hierarchical file system directories. In other embodiments, data streams may be arbitrary sets of data that are not associated with any type of file system or other hierarchy.

Many data storage systems are tasked with handling enormous amounts of data. Additionally, data storage systems often provide data access to large numbers of simultaneous users and software applications. Users and software applications may access the file system via local communications connections, such as a high-speed data bus within a single computer; local area network connections, such as an Ethernet networking or storage area network (SAN) connection; and wide area network connections, such as the Internet, cellular data networks, and other low-bandwidth, high-latency data communications networks.

Cloud storage services are one type of data storage available via a wide-area network. Cloud storage services provide storage to users in the form of a virtualized storage device available via a wide-area network, such as the Internet or a private WAN. In general, users access cloud storage services to store and retrieve data using web services protocols, such as REST, SOAP, or XML-RPC. Cloud storage service providers manage the operation and maintenance of the physical data storage devices; therefore, users of cloud storage services can avoid the initial and ongoing costs associated with buying and maintaining storage devices. Users of cloud storage services also avoid the administrative complexity arising from configuring, managing, and maintaining their own data storage systems. Cloud storage services typically charge users for consumption of storage resources, such as storage space and/or transfer bandwidth, on a marginal or subscription basis, with little or no upfront costs. In addition to the cost and administrative advantages, cloud storage services often provide dynamically scalable capacity to meet its users changing needs. However, previous cloud storage services provide limited storage options for users.

BRIEF DESCRIPTION OF THE DRAWINGS

The invention will be described with reference to the drawings, in which.

SUMMARY

An embodiment of the invention extends the utility of cloud storage services by allowing users to specify a desired storage tier for each data stream stored by the cloud storage service. A cloud storage service access protocol enable users to include one or more specifiers of a desired storage tier for a data stream. In response to receiving one or more storage tier specifiers from a storage client, the cloud storage service performs one or more storage operations to identify at least one target storage device having attributes matching those associated with the requested storage tier. The cloud storage service then stores a data stream from the storage client in the identified target storage device associated with the desired storage tier. In a further embodiment, if a storage client does not specify a desired storage tier for a specific data stream, the cloud storage service may assign the data stream to a default storage tier previously specified by the storage client.

Embodiments of the invention may use a variety of criteria to define different storage tiers, including the cost per unit of capacity of the storage devices; latency in accessing storage devices; the availability of typical uptime of storage devices; the activation state of storage devices; the bandwidth or transfer rate from and/or to the storage devices; and the degree and frequency of replication of the data storage at two or more different cloud storage service data centers.

In a further embodiment, a storage client may also use the cloud storage service access protocol to move a data stream to a different storage tier. In association with this embodiment, the cloud storage service access protocol may include functions to enable storage clients to identify the storage tiers associated with previously stored data streams.

In another embodiment, storage clients may use the cloud storage service access protocol to specify an activation state of storage devices including a data stream. Deactivated storage devices reduce storage costs and activated storage devices are ready to provide data access to a storage client.

In still another embodiment, an optional local storage tier includes storage devices at the same network location as the storage client. The cloud storage service protocol enables storage clients to request all or a portion of a data stream to be prefetched from the cloud storage service and cached in the local storage tier for rapid access by storage clients.

Embodiments of the invention enable cloud storage services to charge storage clients for storage usage based on storage tiers and associated operations, such as transferring data between storage tiers, activating storage devices, and/or prefetching and caching data in a local storage tier.

DETAILED DESCRIPTION

Figure 1:
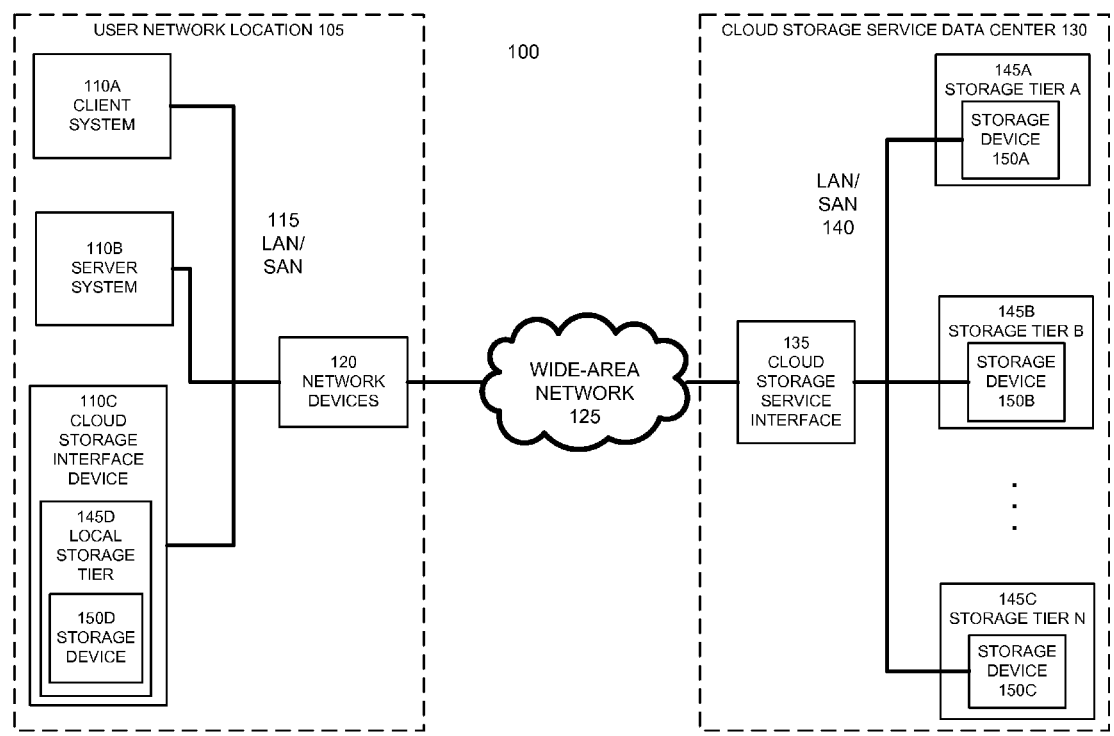
FIG. 1 illustrates a system suitable for use with embodiments of the invention.

FIG. 1 illustrates a system 100 suitable for use with embodiments of the invention. System 100 includes at least one user network location 105. User network location 105 includes one or more storage clients 110, such as storage clients 110a and 110b. Storage clients 110 may include any type of computer or other electronic device capable of accessing data from a cloud storage service, including client and/or server computers 110a and 110b. Storage clients 110 may include software adapted to facilitate access data from a cloud storage service, such as applications, libraries, software modules, application programming interfaces, or operating systems. Storage clients may communicate with cloud storage services via a cloud storage communications protocol. The cloud storage communications protocol may be based on internet transport protocols, such as HTTP, and standard web services protocols, such as SOAP, REST, or XML-RPC, or proprietary service protocols.

User network location 105 may include a local-area network (LAN) 115 for facilitating communications between storage clients 110 and cloud storage services. In a further embodiment, user network location 105 may include a storage-area network instead of or in addition to the local-area network 115. The local-area network 115 is connected with a wide-area network (WAN) 125, such as the internet or a private wide-area network. Other network devices 120, such as gateways, firewalls, and routers, may be used to connect the local-area network 110 with wide-area network 125.

Also connected with the wide-area network 125 is one or more cloud storage services. Each cloud storage service is implemented at one or more cloud storage service data centers, such as cloud storage service data center 130. Cloud storage service data center 130 includes a cloud storage service interface 135 and two or more storage tiers 145, each of which includes at least one data storage system 150. Cloud storage service interface 135 receives data read and write requests using cloud storage protocols, for example based on web services protocols such as XML-RPC, SOAP or REST, and performs corresponding storage operations with the data storage devices 150. Cloud storage service interface 135 may be connected with the data storage devices 150 via local-area networks and/or storage-area networks 140. Cloud storage service interface 135 may access data storage devices using file system protocols, such as CIFS or NFS, and/or block-based storage protocols, such as iSCSI or iFCP.

In a further embodiment, storage clients 110 can include a cloud storage interface device 110c. Cloud storage interface device 110c enables computers and other devices at the user network location 105 to communicate with cloud storage services as if the service was a local storage device. In this embodiment, cloud storage interface device 110c presents computers or other devices one or more virtual storage devices. The cloud storage interface device 110c may provide virtual storage devices using a file system protocol, such as CIFS or NFS, a block-based storage protocols, such as iSCSI or iFCP, and/or any other type of standard or proprietary storage device protocol. In a yet a further embodiment, cloud storage interface device 110c may optionally include a local storage tier 145d including a local data storage device 150d.

As discussed above, the cloud storage service includes two or more storage tiers 145. In an embodiment, each of the storage tiers 145 represents one or more storage devices having a specific set of storage performance attributes. For example, the cloud storage service may include a low performance storage tier, a medium performance storage tier, and a high performance storage tier. In this example, the low performance storage tier may include low speed or offline storage devices, such removable tape and optical storage drives. The latency and transfer speed when accessing data storage devices in this tier may be slow. To compensate for this, a cloud storage service may provide the low performance storage tier to users at a reduced cost. Similarly, the medium performance storage tier may include higher speed storage devices, such as hard drives or hard drive arrays. The high performance storage tier may include very high speed storage devices, such as RAM and volatile memory storage and solid-state storage devices. The cloud storage service in this example may charge substantially more to store and access data in the medium and high performance storage tiers.

A variety of criteria may be used to define different storage tiers, including the cost per unit of capacity of the storage devices; latency in accessing storage devices; the availability of typical uptime of storage devices; the bandwidth or transfer rate from and/or to the storage devices; and the degree and frequency of replication of the data storage at two or more different cloud storage service data centers.

Each of the data storage devices 150 is associated with one or more of the storage tiers based on the attributes of the data storage devices. In one embodiment, each of the storage devices 150 is associated with only a single storage tier. For example, storage devices with low availability and/or high access latency may be associated with a low performance storage tier. In another embodiment, a storage device may be associated with more than one storage tier. For example, a high speed storage device with low availability may be associated with a high speed storage tier and a low availability storage tier. In embodiments of the invention, cloud storage service providers may associate their storage devices with any arbitrary number and combination of storage tiers based on any type or combination of criteria and/or network and storage device attributes.

An embodiment of the invention extends the utility of cloud storage services by allowing users to specify a desired storage tier for each data stream stored by the cloud storage service. In one implementation, the cloud storage service access protocol, for example using XML-RPC, SOAP, or REST, is extended to enable users to include one or more specifiers of a desired storage tier for a data stream. For example, a storage client may indicate the desired storage tier for the data stream by including a specifier with its messages to the cloud storage system to initialize a new data stream. In response to receiving one or more of these specifiers from a storage client via the cloud storage service access protocol, the cloud storage service interface performs one or more storage operations to identify a target storage device having attributes matching those associated with the requested storage tier. Upon receiving the data stream from the storage client via one or more messages using the cloud storage service access protocol, the cloud storage service interface performs one or more storage operations to store the received data stream in the identified storage device in the desired storage tier.

In a further embodiment, if a storage client does not specify a desired storage tier for a specific data stream, the cloud storage service may assign the data stream to a default storage tier previously specified by the storage client. A storage client may specify the default storage tier to the cloud storage service in advance of transferring any data streams there.

In an embodiment, a storage client may also use the cloud storage service access protocol to move a data stream to a different storage tier. In this embodiment, a storage client may send one or more messages via the cloud storage service access protocol to indicate to the cloud storage service that one or more data streams specified by the storage client should be transferred to a different storage tier. In response to receiving one or more of these types of requests from a storage client via the cloud storage service access protocol, the cloud storage service interface performs one or more storage operations to identify a target storage device having attributes matching those associated with the requested storage tier and to transfer the data stream from its current location to the identified storage device in the desired storage tier. In association with this embodiment, the cloud storage service access protocol may include functions to enable storage clients to identify the storage tiers associated with previously stored data streams.

Some types of data storage devices may be placed in a deactivated state to reduce power consumption and wear or an activated state to facilitate data access. In an embodiment, storage clients may use the cloud storage service access protocol to specify an activation state of storage devices including a data stream, thereby reducing storage costs for deactivated storage devices or indicating that one or more data streams should be prepared by the cloud storage service for access by the storage client. For example, a storage client may store a data stream in a low performance storage tier of a cloud storage service. In this storage tier, the cloud storage service deactivates the storage devices and/or takes data offline to reduce storage costs. For example, the cloud storage service may spin down hard drives when not in use or remove tapes or optical media from their respective storage devices. Upon receiving a request to prepare a data stream for access via the cloud storage service access protocol, the cloud storage service interface identifies one or more storage devices and/or storage media required to access the desired data stream. The cloud storage service interface then performs any operations necessary to activate and prepare these storage devices for access, such as spinning up hard drives or loading removable storage media into a storage device.

As described above, a cloud storage interface device 110c may optionally include a local storage tier 145d that includes one or more local storage devices 150d. In a further embodiment, the cloud storage interface device 110c may prefetch and cache all or a portion of a requested data stream from the cloud storage service to improve the performance of future accesses of this data by a user or application. A data stream may selected for prefetching and transferred to the local storage device 150d using the cloud storage service access protocol. In this embodiment, one or more cloud storage service access protocol messages from a user, application, storage client, and/or the cloud storage interface device 110c itself to the cloud storage service may include a request to prefetch one or more data streams. In response to these messages, the cloud storage service interface identifies the data storage including the requested data streams and performs one or more storage operations to transfer the data streams to the cloud storage interface device 110c for storage in local storage device 150d.

In embodiments of the invention, the tiered cloud storage service may charge storage customers based on the functions provided by the cloud storage service access protocols. For example, a cloud storage service may charge storage customers different rates depending on the storage tier selected for a data stream. In another example, a cloud storage service may charge storage customers for transferring a data stream from one storage tier to another storage tier. In still another example, a cloud storage service may charge storage customers for activating and/or deactivating storage devices, for the amount of data that is on the activated storage device, and/or for the time duration that the storage devices are active. In yet another example, a cloud storage service may charge storage customers for prefetching and caching data streams on a local storage device associated with the cloud storage service interface device, for the amount of data that is prefetched and/or cached, and/or for the time duration that the storage devices are active.

Figure 2:
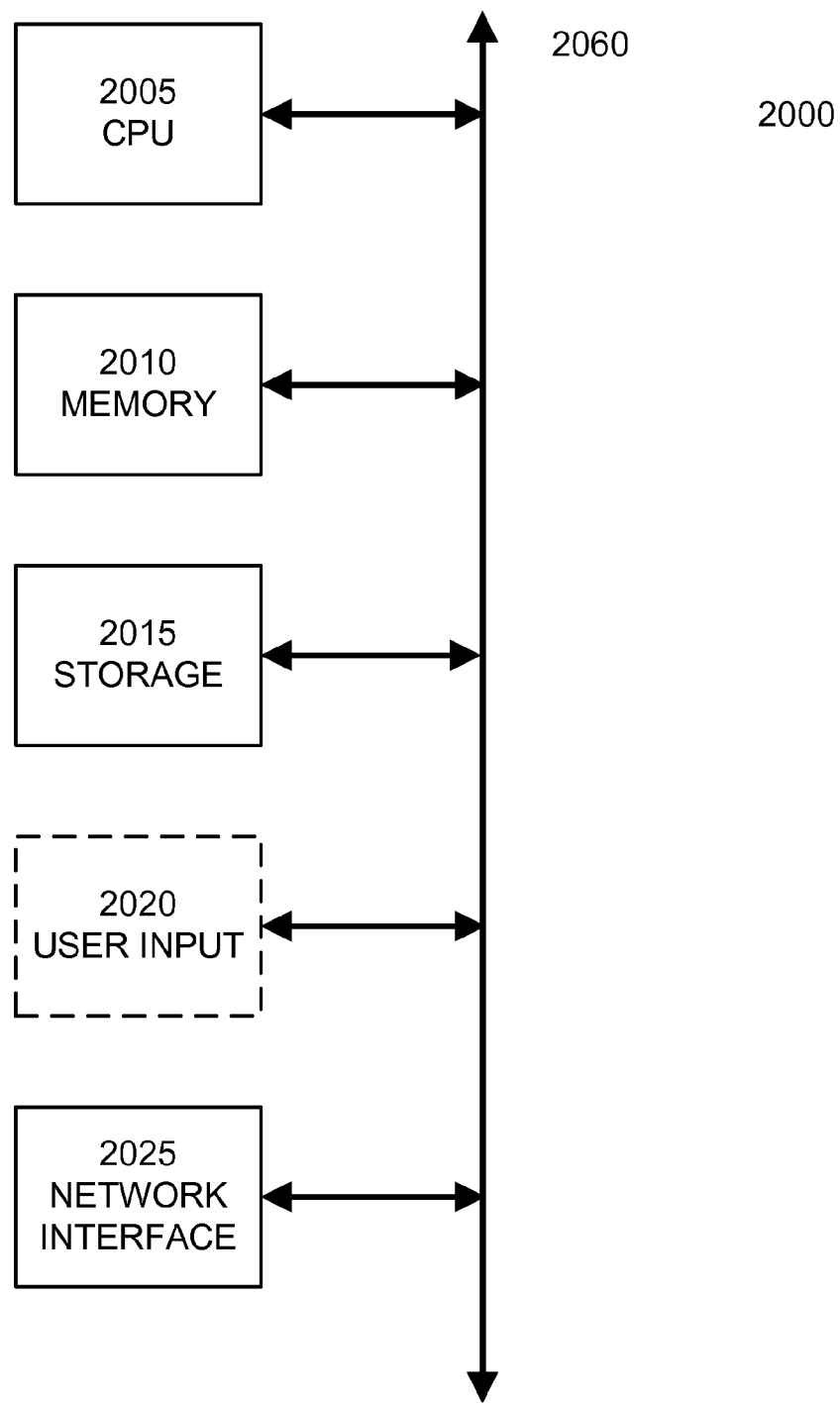
FIG. 2 illustrates a computer system suitable for implementing embodiments of the invention.

FIG. 2 illustrates a computer system suitable for implementing embodiments of the invention. FIG. 2 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or subcombinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of storing a data stream at a cloud storage service network location, the method comprising:
    selecting a cloud storage service network location, wherein the cloud storage service network location is connected with a first network location via a wide-area network, and wherein a storage client is located at the first network location;
    sending a first message from the first network location to a cloud storage service interface at the cloud storage service network location, wherein the first message includes a selection of a first one of a plurality of data storage tiers, wherein the plurality of data storage tiers are based on activation states of data storage devices;
    sending a data stream from the first network location to the cloud storage service network location, wherein the data stream was not already stored on the cloud storage service network location, and wherein cloud storage service interface is adapted to store the data stream in a data storage device associated with the selected one of the data storage tiers; and
    sending a second message from the first network location to the cloud storage service interface at the cloud storage service network location, wherein the second message directs the cloud storage service interface to cache at least a copy of a portion of the data stream in a data cache, wherein the data cache is at the first network location, wherein the second message also directs the cloud storage service interface to activate at least one storage device storing the data stream in preparation for access to at least a portion of the data stream.

2. The method of claim 1, wherein the first message is adapted to initialize the cloud storage service interface to receive the data stream.

3. The method of claim 1, wherein the first message is adapted to indicate that the selected one of the data storage tiers is a default data storage tier.

4. The method of claim 1, wherein the first message is communicated to the cloud storage service interface using a web services protocol.

5. The method of claim 1, wherein the plurality of data storage tiers are based on availability of data storage devices.

6. The method of claim 1, wherein the plurality of data storage tiers are based on costs per unit of storage capacity of data storage devices.

7. The method of claim 1, wherein the plurality of data storage tiers are based on access speeds to data stored by data storage devices.

8. The method of claim 1, wherein the plurality of data storage tiers are based on replication of data stored by data storage devices.

9. The method of claim 1, comprising:
    sending a second message from the first network location to the cloud storage service interface at the cloud storage service network location, wherein the second message directs the cloud storage service interface to move the data stream to a second one of a plurality of data storage tiers.

10. A method of storing a data stream at a cloud storage service network location, the method comprising:
    receiving a first message from a first network location via a wide-area network, wherein the first message includes a selection of a first one of a plurality of data storage tiers;
    identifying at least a first one of a plurality of data storage devices having attributes matching the first one of the plurality of data storage tiers, wherein the plurality of data storage tiers are based on activation states of data storage devices;
    receiving a data stream from the first network location via the wide-area network;
    storing the data stream in the identified first one of the data storage devices;
    receiving a second message from the first network location via the wide-area network, wherein the second message directs at least a copy of a portion of the data stream to be cached at the first network location in preparation for access, and wherein the second message directs the data stream to be prepared for access; and
    in response to the second message,
        identifying at least the first one of the plurality of data storage devices storing the data stream;
        activating the first one of the plurality of data storage devices; and
        transferring the copy of the portion of the data stream to a data cache at the first network location via the wide-area network.

11. The method of claim 10, wherein the first message is adapted to initialize the data stream.

12. The method of claim 10, wherein the first message indicates that the selected one of the data storage tiers is a default data storage tier.

13. The method of claim 10, wherein the first message is received via a web services protocol.

14. The method of claim 10, wherein the plurality of data storage tiers are based on availability of data storage devices.

15. The method of claim 10, wherein the plurality of data storage tiers are based on costs per unit of storage capacity of data storage devices.

16. The method of claim 10, wherein the plurality of data storage tiers are based on access speeds to data stored by data storage devices.

17. The method of claim 10, wherein the plurality of data storage tiers are based on replication of data stored by data storage devices.

18. The method of claim 10, comprising:
    receiving a second message from the first network location via the wide-area network, wherein the second message directs the data stream to be moved to a second one of a plurality of data storage tiers;
    in response to the second message, identifying at least a second one of the plurality of data storage devices having attributes matching the second one of the plurality of data storage tiers; and
    storing the data stream in the identified second one of the data storage devices.

* * * * *